Patented Mar. 1, 1938

2,110,115

UNITED STATES PATENT OFFICE 2,110,115

METHOD OF TREATING MILK

Edward W. Smith, Melrose, Mass., assignor to Submarine Signal Company, Boston, Mass., a corporation of Maine No Drawing. Application April 2, 1937, Serial No. 134,575

7 Claims. (Cl. 99—60)

The present invention relates to a method of treating milk and more particularly to a method of producing soft-curd milk.

It is an object of the present invention to provide a more convenient and economical method of producing soft-curd milk than methods heretofore used. A further object of the present invention is to make available a soft-curd milk having a standard butter-fat content and of such properties that the depth of the cream which rises to the top of the milk on standing will be substantially the same as with untreated milk.

A number of methods have heretofore been proposed for the treatment of milk to reduce the curd tension thereof. Some of these processes consist in dispersing the butter fat in small particles throughout the body of the milk, that is in homogenizing the milk. Such homogenization may be obtained by the use of the well-known pressure homogenizer. It may also be obtained by subjecting the milk to the action of intense compressional wave energy as set forth in the copending application of Leslie A. Chambers, Serial No. 756,504, filed December 4, 1934.

The above processes result in a uniform dispersion of the butter fat throughout the body of the milk. If such milk is allowed to stand, substantially no cream will rise to the top as with untreated milk. It is oftentimes convenient, however, to be able to remove readily the cream from the milk. For example, for infant feeding soft-curd milk is desired because it is easily digested, but not all infants can readily digest much butter-fat. For this reason it is highly desirable to have available a milk which has a low curd tension, but yet upon which the cream will rise upon standing.

In my copending application Serial No. 14,643, filed April 4, 1935, I have described a method whereby such a milk product could be obtained. The method set forth in that application was based upon my discovery that in reducing the curd tension of milk by homogenization it is only necessary to disperse substantially one-half of one percent by weight of butter fat within the body of the milk. In that application the majority of the cream was initially removed from the whole milk, leaving only about one-half of one percent butter fat by weight within the milk; the milk with this small quantity of cream was homogenized and subsequently the cream which was initially removed was added to the treated milk.

I have now discovered that a milk product having a sufficiently low curd tension to bring it within the class usually termed as "soft-curd milk" (present New York city standard, 33 grams or below) can be obtained by a simple and convenient procedure. Furthermore, soft-curd milk having a cream line substantially the same as normal untreated milk is also readily obtained.

According to the present invention whole milk which may have a curd tension of 40 grams or more is treated by any desired method to reduce its curd tension to approximately 20 grams or less. This treated milk is then mixed with untreated milk in the ratio of one part of the treated milk to four parts of the untreated milk by volume. By thus mixing milk which has been treated to have a low curd tension with normal untreated milk having a higher curd tension, the curd tension of the entire body of the milk can be reduced sufficiently so that it is still below the standard generally accepted for soft-curd milk.

For example, I have taken normal whole market milk having a curd tension of approximately 40 grams and mixed four parts by volume of this milk with one part of similar milk which was treated by homogenization to reduce its curd tension to approximately 19 grams and have obtained a resulting milk whose curd tension is about 28 grams, which is well below the New York city standard of 33 grams for soft-curd milk. Furthermore, the resulting milk product has the much desired characteristic that its cream content will, when the milk is allowed to stand, rise to the top of the milk to give a cream line of substantially the same depth as that of the milk before treatment.

If the ratio of treated to untreated milk is made somewhat less than one to four, the resultant product will have a curd tension substantially nearer to the initial curd tension of the treated portion of the milk, whereas if the ratio of treated to untreated milk is made greater than one to four, the curd tension of the resultant mixture will tend to approach that of the untreated milk.

Heretofore it had been supposed that it was necessary in order to obtain a reduction in curd tension of milk by homogenization to disperse at least a small amount of butter fat within the entire body of the milk whose curd tension was to be reduced. It will appear from the above, however, that by the present invention it is now merely necessary to disperse the desired amount of butter fat within a relatively small quantity of milk and subsequently to add thereto a quantity of untreated milk in order to reduce the curd tension of the entire body of the milk. In order to obtain a substantial reduction in curd tension it appears to be sufficient if the quantity of the dispersed butter fat is at least approximately one-half of one percent by weight of the total final body of the milk.

Having now described my invention, I claim:

1. A method of treating normal whole hard curd milk which comprises homogenizing one-fifth of the body of the milk to reduce the curd tension thereof to a relatively low value and remixing the same after treatment with the remainder of the milk, whereby the mixture becomes a soft curd milk.

2. A method of treating milk which comprises dispersing the butter fat in a quantity of hard curd milk to reduce the curd tension to a relatively low value and subsequently adding a minor quantity of the treated milk to a major quantity of hard curd milk, whereby the curd tension of the mixture is reduced to a soft curd value.

3. A method of treating normal whole hard curd milk which comprises homogenizing a minor quantity of the same to lower curd tension thereof to a relatively low value and subsequently remixing the homogenized minor portion with an unhomogenized major portion, whereby the mixture becomes a soft curd milk.

4. A method of treating normal whole hard curd milk to reduce the curd tension thereof to a soft curd value which comprises homogenizing a portion of the same to reduce the curd tension of that portion to a relatively low value and subsequently mixing the treated portion with such quantity of untreated portion that the butter fat content of the treated portion is approximately one-half of one percent by weight of the total final body of the milk.

5. A method of treating normal whole hard curd milk to reduce the curd tension thereof to a soft curd value which comprises homogenizing a portion of the same to reduce the curd tension of that portion to a relatively low value and subsequently mixing the treated portion with a quantity of the untreated portion in such proportions that the cream of the combined milk when it rises to the surface appears to have approximately the same volume as the cream in the original whole milk.

6. A method of treating milk which comprises homogenizing a quantity of normal whole hard curd milk to reduce the curd tension thereof to a relatively low value and subsequently mixing the same with a quantity of similar whole hard curd milk which has not been homogenized in proportion approximately of one part of the former to four parts of the latter, whereby a soft curd milk is produced.

7. A method of making soft curd milk which comprises homogenizing a minor body of hard curd milk to reduce the curd tension thereof to a relatively low value and subsequently mixing said body of milk with a major body of hard curd milk whereby the curd tension of the mixture is below the maximum limits established for soft curd milk.

EDWARD W. SMITH.